US012776318B2

(12) United States Patent
Atsumi

(10) Patent No.: US 12,776,318 B2
(45) Date of Patent: *Oct. 27, 2026

(54) VEHICLE CONTROL SYSTEM AND VEHICLE CONTROL METHOD

(71) Applicant: TOYOTA JIDOSHA KABUSHIKI KAISHA, Toyota (JP)

(72) Inventor: Ryuta Atsumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 184 days.

This patent is subject to a terminal disclaimer.

(21) Appl. No.: 18/804,543

(22) Filed: Aug. 14, 2024

(65) Prior Publication Data

US 2024/0404524 A1 Dec. 5, 2024

Related U.S. Application Data

(63) Continuation of application No. 17/591,730, filed on Feb. 3, 2022, now Pat. No. 12,087,295.

(30) Foreign Application Priority Data

Mar. 29, 2021 (JP) ................................ 2021-055248

(51) Int. Cl.
*G10L 15/22* (2006.01)
*G10L 15/32* (2013.01)

(52) U.S. Cl.
CPC ............. *G10L 15/22* (2013.01); *G10L 15/32* (2013.01); *G10L 2015/223* (2013.01)

(58) Field of Classification Search
CPC .... G10L 15/22; G10L 15/32; G10L 2015/223
See application file for complete search history.

(56) References Cited

U.S. PATENT DOCUMENTS

| | | | | |
|---|---|---|---|---|
| 10,852,720 | B2 * | 12/2020 | Dusane | G05D 1/0016 |
| 2015/0379987 | A1 | 12/2015 | Panainte | |
| 2016/0118048 | A1 * | 4/2016 | Heide | G10L 15/22 704/275 |
| 2017/0011743 | A1 * | 1/2017 | Matsumoto | G10L 15/30 |

(Continued)

FOREIGN PATENT DOCUMENTS

JP 2020-160832 A 10/2020

*Primary Examiner* — Mark Villena
(74) *Attorney, Agent, or Firm* — Oblon, McClelland, Maier & Neustadt, L.L.P.

(57) ABSTRACT

A vehicle control system includes a portable terminal and a vehicle on-board device that carries out wireless communication with the portable terminal. The vehicle on-board device includes a first voice recognition unit that recognizes a voice and a control unit that executes control of a vehicle according to the voice recognized at the first voice recognition unit. The portable terminal includes a second voice recognition unit that recognizes a voice, a specification unit that specifies control of the vehicle according to the voice recognized at the second voice recognition unit, an instruction unit that instructs the control unit to execute the specified control of the vehicle, and a notification unit that, in a case in which the control of the vehicle according to the voice recognized at the second voice recognition unit cannot be specified at the specification unit, performs notification according to at least an operation state of the first voice recognition unit.

10 Claims, 10 Drawing Sheets

(56) References Cited

U.S. PATENT DOCUMENTS

| | | | |
|---|---|---|---|
| 2017/0166147 | A1 | 6/2017 | Hiroki |
| 2017/0169814 | A1 | 6/2017 | Pashine |
| 2017/0236510 | A1 | 8/2017 | Fuchiwaki |
| 2017/0308689 | A1 | 10/2017 | Boesen |
| 2018/0061410 | A1 | 3/2018 | Biswal |
| 2018/0096684 | A1* | 4/2018 | Goote .................... B60R 16/023 |
| 2019/0049942 | A1* | 2/2019 | Dusane .................... G10L 15/22 |
| 2019/0130916 | A1 | 5/2019 | Mori |
| 2020/0307620 | A1 | 10/2020 | Wagatsuma et al. |
| 2021/0139036 | A1 | 5/2021 | Kim |
| 2021/0151057 | A1* | 5/2021 | Sinha ....................... G10L 25/51 |
| 2022/0185111 | A1* | 6/2022 | Biswal ................ G10L 15/1822 |

* cited by examiner

VEHICLE CONTROL SYSTEM AND VEHICLE CONTROL METHOD

CROSS-REFERENCE TO RELATED APPLICATION

This application is a continuation of and claims benefit under 35 U.S.C. § 120 to U.S. application Ser. No. 17/591,730, filed Feb. 3, 2022, which is based upon and claims the benefit of priority under 35 USC § 119 from Japanese Patent Application No. 2021-055248 filed on Mar. 29, 2021, the entire contents of each of which are incorporated herein by reference.

BACKGROUND

Technical Field

The present disclosure relates to a vehicle control system and a vehicle control method.

Related Art

U.S. Patent Application Publication No. 2017/0308689 discloses technology of a portable device equipped with a microphone that is capable of communicating with a vehicle, in which a command for causing predetermined control to be executed is output to the vehicle based on an uttered instruction of an occupant.

Here, the vehicle side may also be provided with a voice recognition device as a vehicle on-board device. In a case in which the occupant has intended to make an utterance to the vehicle on-board device but the portable device also performs voice recognition, if a command is supported at the vehicle on-board device side but is not supported at the portable device side, the portable device gives feedback to the occupant that the command is not supported, giving the occupant an uncomfortable feeling.

SUMMARY

An object of the present disclosure is to provide a vehicle control system and a vehicle control method that appropriately perform notification in consideration of voice recognition at a vehicle on-board device side and voice recognition at a portable terminal.

Means for Solving the Problem

A first aspect is a vehicle control system comprising a portable terminal and a vehicle on-board device that carries out wireless communication with the portable terminal, wherein: the vehicle on-board device comprises a first voice recognition unit that recognizes a voice, and a control unit that executes control of a vehicle according to the voice recognized at the first voice recognition unit; and the portable terminal comprises a second voice recognition unit that recognizes a voice, a specification unit that specifies control of the vehicle according to the voice recognized at the second voice recognition unit, an instruction unit that instructs the control unit to execute the specified control of the vehicle, and a notification unit that, in a case in which the control of the vehicle according to the voice recognized at the second voice recognition unit cannot be specified at the specification unit, performs notification according to at least an operation state of the first voice recognition unit.

In the vehicle control system of the first aspect, at the vehicle on-board device, the first voice recognition unit recognizes the voice, and the control unit executes the control of the vehicle according to the voice recognized at the first voice recognition unit. Further, at the portable terminal, the second voice recognition unit recognizes the voice, the specification unit specifies the control of the vehicle according to the voice recognized at the second voice recognition unit, and the instruction unit instructs the control unit to execute the specified control of the vehicle. Further, in a case in which the control of the vehicle according to the voice recognized at the second voice recognition unit cannot be specified at the specification unit, the notification unit performs notification according to at least the operation state of the first voice recognition unit of the vehicle on-board device. As a result, in a case in which the control of the vehicle according to the voice recognized at the portable terminal cannot be specified, notification that the control of the vehicle cannot be specified is performed according to the operation state of the voice recognition of the vehicle on-board device. That is to say, it is possible to appropriately perform notification in consideration of the voice recognition at the vehicle on-board device side and the voice recognition at the portable terminal. It should be noted that specifying the control of the vehicle according to the voice means specifying a content of the control of the vehicle that has been instructed by the voice. Further, performing notification means performing notification of feedback with respect to the recognized voice.

A vehicle control system of a second aspect is the vehicle control system of the first aspect, wherein, in a case in which the control of the vehicle cannot be specified by the specification unit and in which recognition of the voice by the first voice recognition unit is operating, the notification unit cancels the notification. As a result, even in a case in which the control of the vehicle according to the voice recognized at the portable terminal cannot be specified, it is possible provide a configuration such that notification that the control of the vehicle cannot be specified is not performed when the voice recognition of the vehicle on-board device is operating.

A vehicle control system of a third aspect is the vehicle control system of the first aspect or the second aspect, wherein, in a case in which recognition of the voice by the first voice recognition unit is operating, the specification unit does not carry out specification of the control of the vehicle. As a result, in a case in which the voice recognition of the vehicle on-board device is operating, it is possible to provide a configuration such that specification of the control of the vehicle according to the voice recognized at the portable terminal is not carried out, and such that the notification according to the voice recognized at the portable terminal is canceled.

A vehicle control system of a fourth aspect is the vehicle control system of any one of the first aspect to the third aspect, wherein the control unit preferentially executes the control of the vehicle according to the voice recognized by the first voice recognition unit over the control of the vehicle specified by the specification unit of the portable terminal. As a result, even in a case in which both the control of the vehicle specified by the portable terminal and the control of the vehicle according to the voice recognized by the vehicle on-board device exist, the control of the vehicle can be appropriately executed.

A vehicle control system of a fifth aspect is the vehicle control system of any one of the first aspect to the third aspect, wherein the control unit determines whether or not a person is aboard the vehicle based on information acquired at the vehicle on-board device and, in a case in which it has been determined that a person is not aboard the vehicle, preferentially executes the control of the vehicle specified by the specification unit of the portable terminal over the control of the vehicle according to the voice recognized by the first voice recognition unit. As a result, even in a case in which both the control of the vehicle specified by the portable terminal and the control of the vehicle according to the voice recognized by the vehicle on-board device exist, the control of the vehicle can be appropriately executed.

A vehicle control system of a sixth aspect is the vehicle control system of any one of the first aspect to the third aspect, wherein, in a case in which it has been determined that a person is not aboard the vehicle based on information acquired at the portable terminal, the control unit preferentially executes the control of the vehicle specified by the specification unit of the portable terminal over the control of the vehicle according to the voice recognized by the first voice recognition unit. As a result, even in a case in which both the control of the vehicle specified by the portable terminal and the control of the vehicle according to the voice recognized by the vehicle on-board device exist, the control of the vehicle can be appropriately executed.

A vehicle control system of a seventh aspect is the vehicle control system of any one of the first aspect to the sixth aspect, wherein, in a case in which a specific character string is included in the voice recognized by the second voice recognition unit, the control unit preferentially executes the control of the vehicle specified by the specification unit of the portable terminal over the control of the vehicle according to the voice recognized by the first voice recognition unit. As a result, even in a case in which both the control of the vehicle specified by the portable terminal and the control of the vehicle according to the voice recognized by the vehicle on-board device exist, the control of the vehicle can be appropriately executed.

An eighth aspect is a vehicle control method in a vehicle control system comprising a portable terminal and a vehicle on-board device that carries out wireless communication with the portable terminal, wherein: a first voice recognition unit of the vehicle on-board device recognizes a voice; a control unit of the vehicle on-board device executes control of a vehicle according to the voice recognized at the first voice recognition unit; a second voice recognition unit of the portable terminal recognizes a voice; a specification unit of the portable terminal specifies control of the vehicle according to the voice recognized at the second voice recognition unit; an instruction unit of the portable terminal instructs the control unit to execute the specified control of the vehicle; and, in a case in which the control of the vehicle according to the voice recognized at the second voice recognition unit cannot be specified at the specification unit, a notification unit of the portable terminal performs notification according to at least an operation state of the first voice recognition unit.

In the vehicle control method of the eighth aspect, at the vehicle on-board device, the first voice recognition unit recognizes the voice, and the control unit executes the control of the vehicle according to the voice recognized at the first voice recognition unit. Further, at the portable terminal, the second voice recognition unit recognizes the voice, the specification unit specifies the control of the vehicle according to the voice recognized at the second voice recognition unit, and the instruction unit instructs the control unit to execute the specified control of the vehicle. In a case in which the control of the vehicle according to the voice recognized at the second voice recognition unit cannot be specified at the specification unit, the notification unit of the portable terminal performs notification according to at least the operation state of the first voice recognition unit. As a result, in a case in which the control of the vehicle according to the voice recognized at the portable terminal cannot be specified, notification that the control of the vehicle cannot be specified is performed according to the operation state of the voice recognition of the vehicle on-board device. That is to say, it is possible to appropriately perform notification in consideration of the voice recognition at the vehicle on-board device side and the voice recognition at the portable terminal.

Effect of the Invention

According to the present disclosure, it is possible to appropriately perform notification in consideration of the voice recognition at the vehicle on-board device side and the voice recognition at the portable terminal.

BRIEF DESCRIPTION OF THE DRAWINGS

Exemplary embodiments of the present disclosure will be described in detail based on the following figures, wherein.

DETAILED DESCRIPTION

First Embodiment

Figure 1:
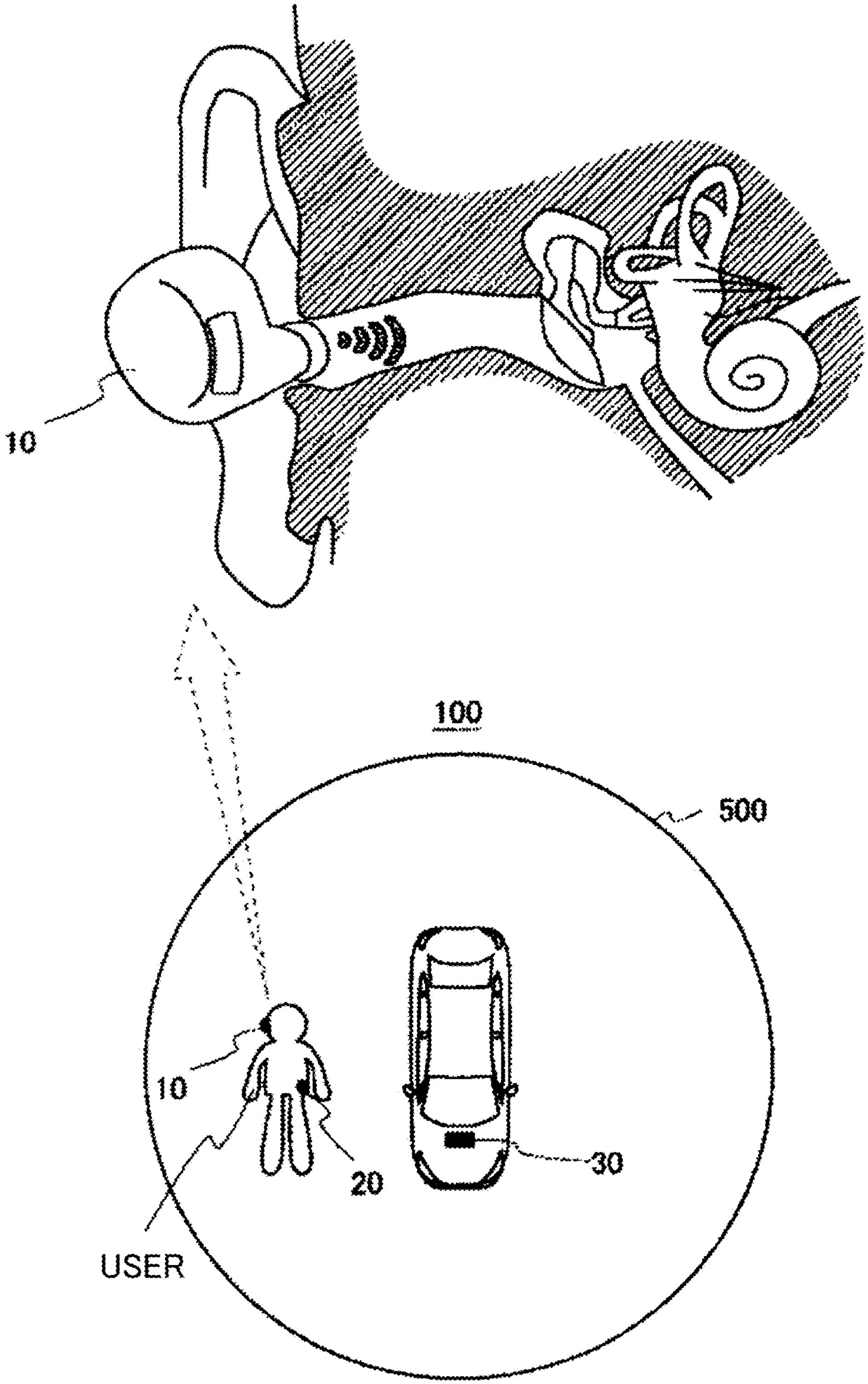
FIG. 1 is a figure showing an example of a configuration of a vehicle control system according to an embodiment of the present disclosure.

FIG. 1 is a diagram showing an example of a configuration of a vehicle control system according to a first embodiment.

(Configuration)

As an example, a vehicle control system 100 includes a terminal device 10 worn on an ear of a user, a portable terminal 20 possessed by the user, and a vehicle on-board device 30 mounted at a vehicle. The terminal device 10 is capable of wireless communication with the vehicle on-board device 30 when a distance from the vehicle on-board device 30 is within a predetermined range 500, which is within a certain distance. Further, the portable terminal 20 is a portable terminal device such as, for example, a smartphone, and is capable of wireless communication with the terminal device 10 when a distance from the terminal device 10 is within a certain distance. The predetermined range 500 is, for example, a range of about 10 m or less from the vehicle on-board device 30.

Figure 2:
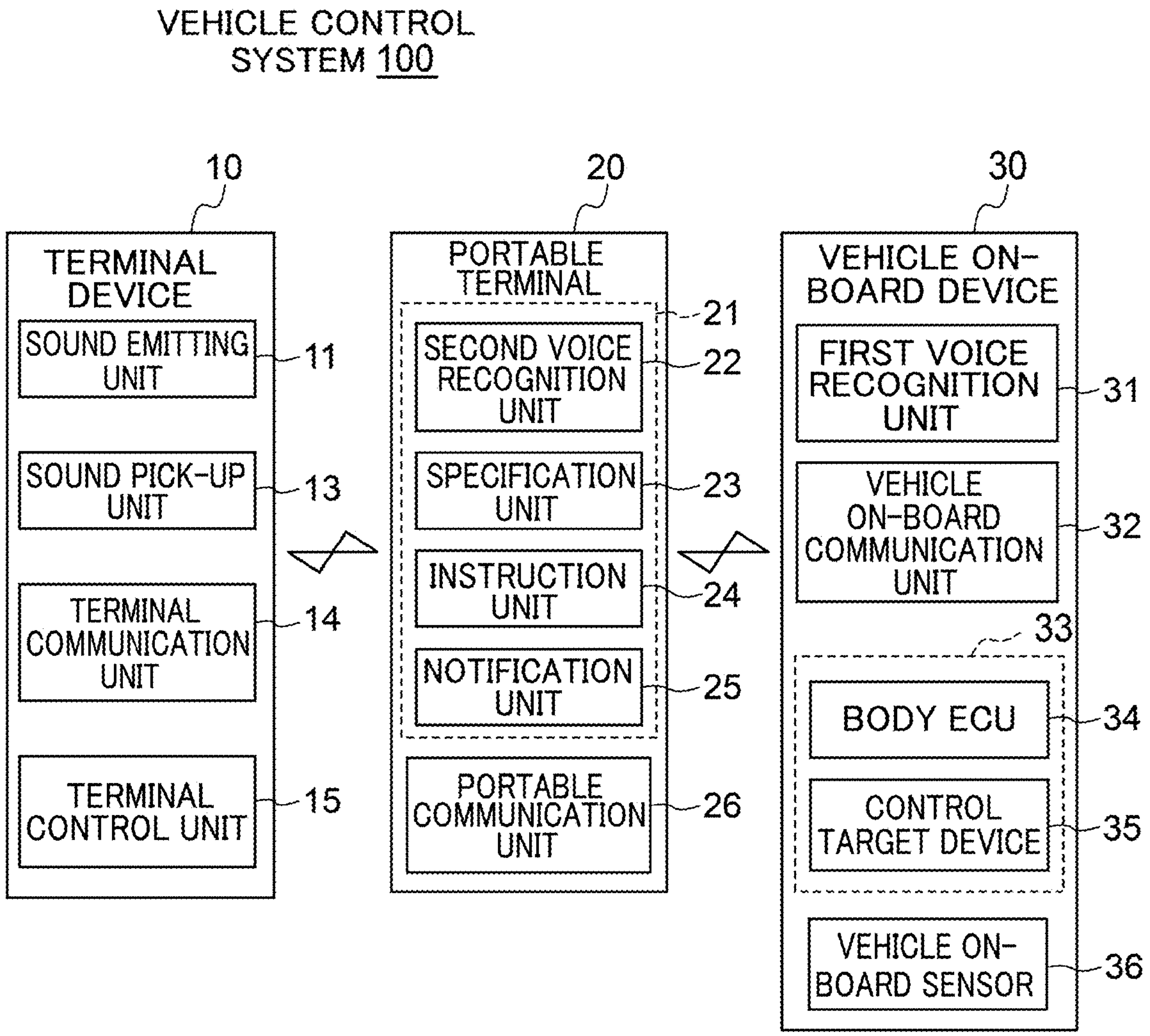
FIG. 2 is a figure showing functional blocks of the vehicle control system according to an embodiment of the present disclosure.

FIG. 2 shows an example of functional blocks of the vehicle control system 100. The terminal device 10 includes a sound emitting unit 11 that emits sound into an ear canal of the user, a sound pick-up unit 13 that picks up a voice of the user, and a terminal communication unit 14 that carries out wireless communication with the portable terminal 20 and the vehicle on-board device 30, and may further include various buttons, an acceleration sensor, and the like. Further, the terminal device 10 includes a terminal control unit 15 that controls operation of these respective units. The terminal communication unit 14 carries out wireless communication using, for example, Bluetooth (registered trademark).

Further, the terminal device 10 includes a user authentication unit that carries out authentication of the user based on acoustic reflection sound in the ear, and a first authentication unit that carries out authentication with the vehicle on-board device 30 by wireless communication in a case in which it has entered within the predetermined range 500 in which wireless communication with the vehicle on-board device 30 is possible. After authentication of the user and authentication with the vehicle on-board device 30 has succeeded, the terminal communication unit 14 transmits data of the voice that has been picked up, to the portable terminal 20.

The portable terminal 20 includes a portable control unit 21. The portable control unit 21 includes a second voice recognition unit 22 that recognizes the voice picked up at the terminal device 10, and a specification unit 23 that specifies control of the vehicle according to the recognized voice.

Further, the portable control unit 21 includes an instruction unit 24 that instructs a body ECU 34 of the vehicle on-board device 30, which will be described later, to execute the specified control of the vehicle, and a notification unit 25 that, in a case in which specification cannot be performed at the specification unit 23, performs notification by the terminal device 10 according to an operation state of a first voice recognition unit 31, which will be described later.

In a case in which voice recognition by the first voice recognition unit 31 is operating, the specification unit 23 does not carry out specification of the control of the vehicle according to the recognized voice. As a result, in a case in which the voice recognition by the first voice recognition unit 31 is operating, the notification unit 25 does not perform notification of feedback according to the voice recognized by the second voice recognition unit 22.

Further, the portable terminal 20 includes a portable communication unit 26 that carries out communication with the terminal device 10, the vehicle on-board device 30 and a server (not shown in the drawings), and further includes an input unit that accepts input from the user, a display unit that displays a notification to the user, and the like. The second voice recognition unit 22 may be configured so as to carry out communication with the server to recognize the picked up voice. The portable communication unit 26 carries out wireless communication with the terminal device 10 and the vehicle on-board device 30 using, for example, Bluetooth (registered trademark).

The vehicle on-board device 30 includes the first voice recognition unit 31 that recognizes the voice picked up at the terminal device 10, a vehicle on-board communication unit 32 that carries out communication with the terminal device 10 and the portable terminal 20, a vehicle on-board control unit 33 that executes the control of the vehicle according to the recognized voice, and a vehicle on-board sensor 36. The vehicle on-board control unit 33 includes the body ECU 34 and a control target device 35. The control target device 35 includes, for example, a power window ECU for controlling a power window, a sliding roof ECU for controlling a sliding roof, a power back door ECU for controlling a power back door, or a power sliding door ECU for controlling a power sliding door.

The first voice recognition unit 31 recognizes the voice picked up at the terminal device 10 and carries out multimedia control of a navigation system. Further, the first voice recognition unit 31, for example, carries out wireless communication with the terminal device 10 using Bluetooth (registered trademark), and carries out communication with the body ECU 34 using a vehicle on-board LAN.

The vehicle on-board communication unit 32, for example, carries out wireless communication with the terminal device 10 and the portable terminal 20 using Bluetooth (registered trademark), and carries out communication with the first voice recognition unit 31 using the vehicle on-board LAN.

The vehicle on-board device 30 includes a second authentication unit that communicates with the first authentication unit to carry out authentication with the terminal device 10.

The terminal control unit 15, the portable control unit 21, and the vehicle on-board control unit 33 each include a CPU that executes a control processing program and a storage unit that appropriately stores information used in control processing. The control processing program is stored in advance in a non-transitory computer-readable recording medium. Further, the portable communication unit 26 and the vehicle on-board communication unit 32 may carry out wireless communication with an external server via a network such as, for example, the Internet or the like.

(Processing)

Figure 3A:
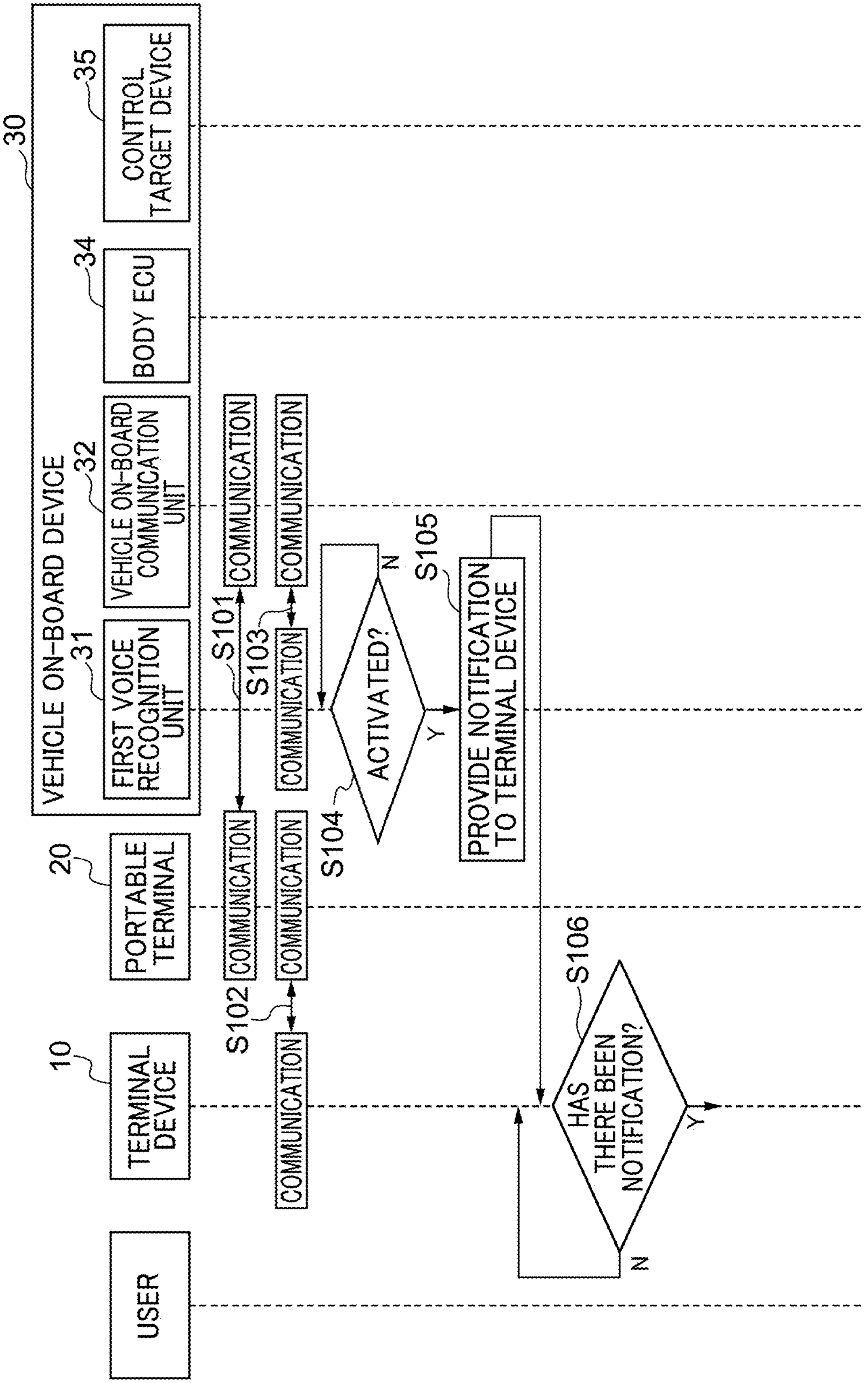
FIGS. 3A and 3B are sequence diagrams showing processing according to a first embodiment of the present disclosure.
Figure 3B:
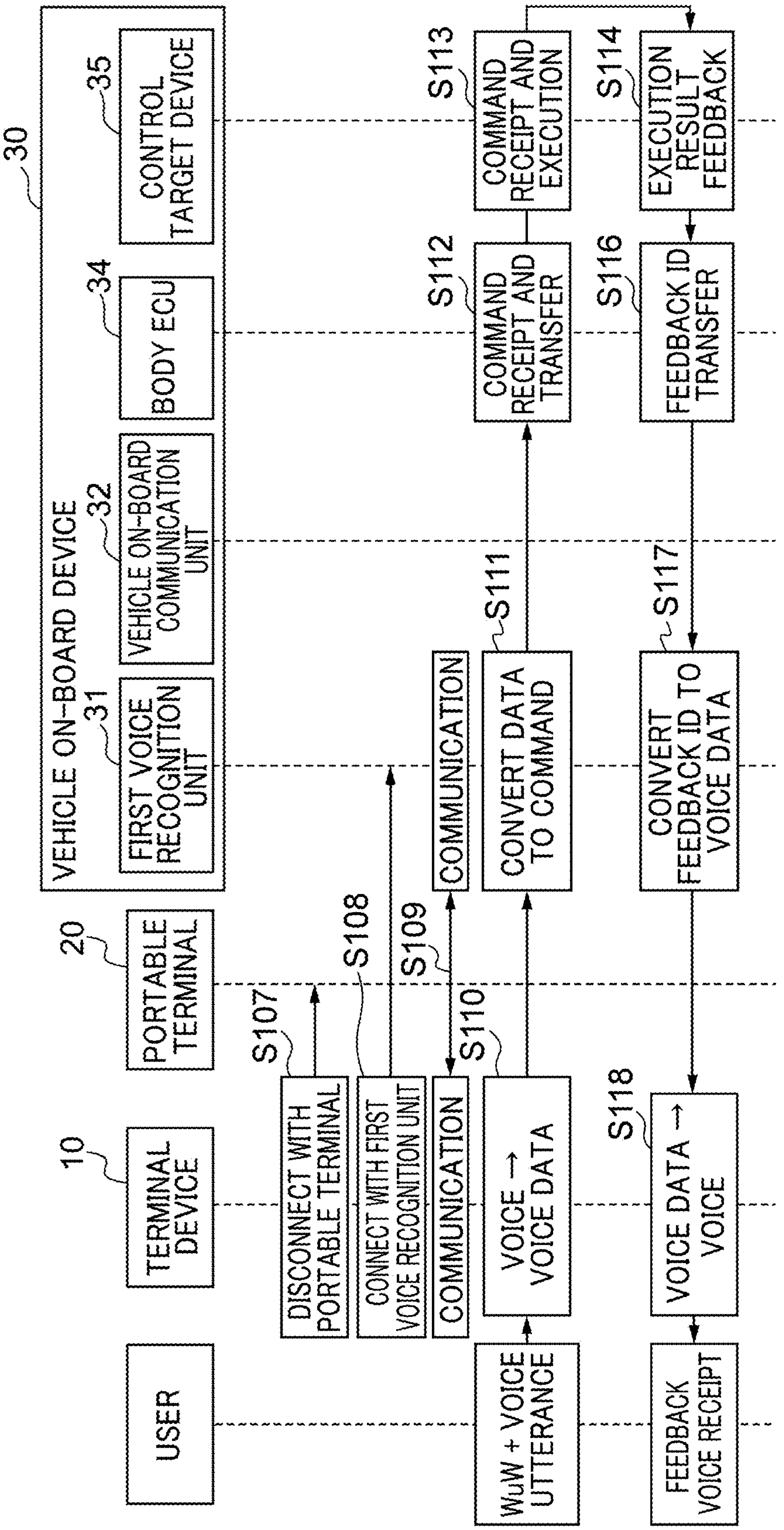

FIGS. 3A and 3B are sequence diagrams explaining processing carried out by the terminal device 10, the portable terminal 20, and the vehicle on-board device 30. The content of the processing will be explained with reference to FIGS. 3A and 3B.

First, the terminal device 10 carries out ear canal authentication. The ear canal authentication may be carried out when the terminal device 10 has been attached to an ear, may be carried out regularly thereafter, or may be carried out before each time the terminal device 10 carries out some kind of operation. As an example, the user authentication unit of the terminal device 10 emits a sound for authentication from the sound emitting unit 11 to the auditory canal, acquires a reverberant sound thereof at the sound pick-up unit 13, and compares characteristics of the reverberant sound and characteristics of reverberant sound of a legitimate user that have been recorded in advance, to thereby authenticate the user. In a case of authentication failure, no further processing is carried out. It should be noted that the sound for authentication may be a sound in an audible band, or may be a sound in a non-audible band such as ultrasonic waves. In the case of a sound in the audible band, the user can know from the sound thereof that the authentication process is carried out. Further, in the case of a sound in the non-audible band, the user may be notified by a voice such as "Authentication will be performed" before the authentication processing.

Then, the processing of FIGS. 3A and 3B is started, for example, when the portable terminal 20 has arrived within the predetermined range 500 in which wireless communication with the vehicle on-board device 30 is possible.

At step S101, wireless communication is carried out between the portable communication unit 26 of the portable terminal 20 and the vehicle on-board communication unit 32 of the vehicle on-board device 30, and communication is established. At this time, authentication is carried out by collating whether an identifier of the terminal device 10 matches a legitimate identifier that has been registered in advance at the vehicle on-board device 30. Alternatively, authentication may be carried out by collating whether an identifier of the vehicle on-board device 30 matches a legitimate identifier that has been registered in advance at the terminal device 10. In a case of authentication failure, no further processing is carried out.

In a case in which the authentication has succeeded, the terminal device 10 drives the sound emitting unit 11 to carry out notification with respect to the user. As a result, the user can know that the terminal device 10 has entered the range in which communication with the vehicle on-board device 30 is possible. The method of notification is not limited, and the terminal device 10 may include a vibrator and carry out vibration.

At step S102, wireless communication is carried out between the terminal communication unit 14 of the terminal device 10 and the portable communication unit 26 of the portable terminal 20, and communication is established. Further, at step S103, communication is carried out between the first voice recognition unit 31 of the vehicle on-board device 30 and the vehicle on-board communication unit 32, and communication is established.

At step S104, the vehicle on-board device 30 determines whether or not the first voice recognition unit 31 has been activated. In a case in which the first voice recognition unit 31 has been activated, the process proceeds to step S105.

At step S105, the first voice recognition unit 31 of the vehicle on-board device 30 provides notification that the first voice recognition unit 31 has been activated, to the terminal communication unit 14 of the terminal device 10 via the vehicle on-board communication unit 32 and the portable communication unit 26 of the portable terminal 20.

At step S106, the terminal device 10 determines whether or not there has been a notification indicating that the first voice recognition unit 31 has been activated. In a case in which there has been a notification indicating that the first voice recognition unit 31 has been activated, the process proceeds to step S107.

At step S107, the terminal device 10 disconnects the communication that has been established with the portable communication unit 26 of the portable terminal 20.

At step S108, the terminal device 10 is connected to the first voice recognition unit 31 of the vehicle on-board device 30 by wireless communication, and at step S109, communication is carried out between the terminal communication unit 14 of the terminal device 10 and the first voice recognition unit 31 of the vehicle on-board device 30, and communication is established.

Then, when the user utters a wake-up word (WuW: Wake Up Word) and a voice command for instructing the control of the vehicle, at step S110, the sound pick-up unit 13 of the terminal device 10 transmits data of the voice that has been picked up, to the first voice recognition unit 31.

At step S111, the first voice recognition unit 31 of the vehicle on-board device 30 recognizes the picked-up voice, performs conversion to a command, and transmits the command to the body ECU 34.

At step S112, the body ECU 34 receives the command from the first voice recognition unit 31 and transfers the command to the control target device 35.

At step S113, the control target device 35 receives the command from the body ECU 34 and executes the control according to the command.

At step S114, the control target device 35 provides feedback of an execution result of aforementioned step S113 to the body ECU 34.

At step S116, the body ECU 34 transfers a feedback ID corresponding to the feedback of aforementioned step S114 to the first voice recognition unit 31.

At step S117, the first voice recognition unit 31 performs conversion to voice data corresponding to the feedback ID and transmits the voice data to the terminal device 10.

At step S118, the terminal device 10 outputs a voice corresponding to the voice data by the sound emitting unit 11. Then, the user receives the voice providing feedback of the execution result of aforementioned step S113.

Overview of First Embodiment

In the vehicle control system of the present embodiment, even in a case in which the control of the vehicle according to the voice recognized at the portable terminal cannot be specified, it is possible to provide a configuration so as not to perform notification that the control of the vehicle cannot be specified in a case in which the voice recognition of the vehicle on-board device is operating. That is to say, it is possible to appropriately perform notification in consideration of the voice recognition at the vehicle on-board device side and the voice recognition at the portable terminal.

Further, when the user boards the vehicle with the terminal device 10 attached and turns on an ignition switch, the first voice recognition unit 31 of the vehicle on-board device 30 operates. At that time, when the user makes an utterance to instruct the control of the vehicle by voice, voice recognition is carried out at both the portable terminal 20 and the vehicle on-board device 30. This is because, at both the portable terminal 20 and the vehicle on-board device 30, there are no means for monitoring each other's operating states, and there are no means for arbitrating with each other. In the present embodiment, the portable terminal 20 detects the activation of the first voice recognition unit 31 of the vehicle on-board device 30 and switches so as to connect the terminal device 10 and the first voice recognition unit 31 of the vehicle on-board device 30. As a result, voice recognition is carried out at both the portable terminal 20 and the vehicle on-board device 30, and it is possible to suppress occurrence of inconvenience for the user.

Second Embodiment

In the first embodiment, the terminal device 10 picks up the voice. On the other hand, a second embodiment differs from the first embodiment in that the terminal device 10 and a microphone of the vehicle on-board device 30 each pick up the voice, and the picked-up voice is recognized and converted to a command at the portable terminal 20 and the vehicle on-board device 30 in parallel. Differences from the first embodiment will be explained below. It should be noted that identical reference numerals are given to identical configurations, and that explanation thereof is omitted.

(Configuration)

The specification unit 23 of the portable terminal 20 carries out specification of the control of the vehicle according to the recognized voice regardless of whether or not the voice recognition by the first voice recognition unit 31 is operating.

In a case in which the control of the vehicle cannot be specified by the specification unit 23 and the voice recognition by the first voice recognition unit 31 is operating, the notification unit 25 does not perform notification of feedback indicating that the control of the vehicle according to the recognized voice cannot be specified.

The vehicle on-board control unit 33 of the vehicle on-board device 30 preferentially executes the control of the vehicle according to the voice recognized by the first voice recognition unit 31 over the control of the vehicle specified by the specification unit 23 of the portable terminal 20.

(Processing)

Figure 4A:
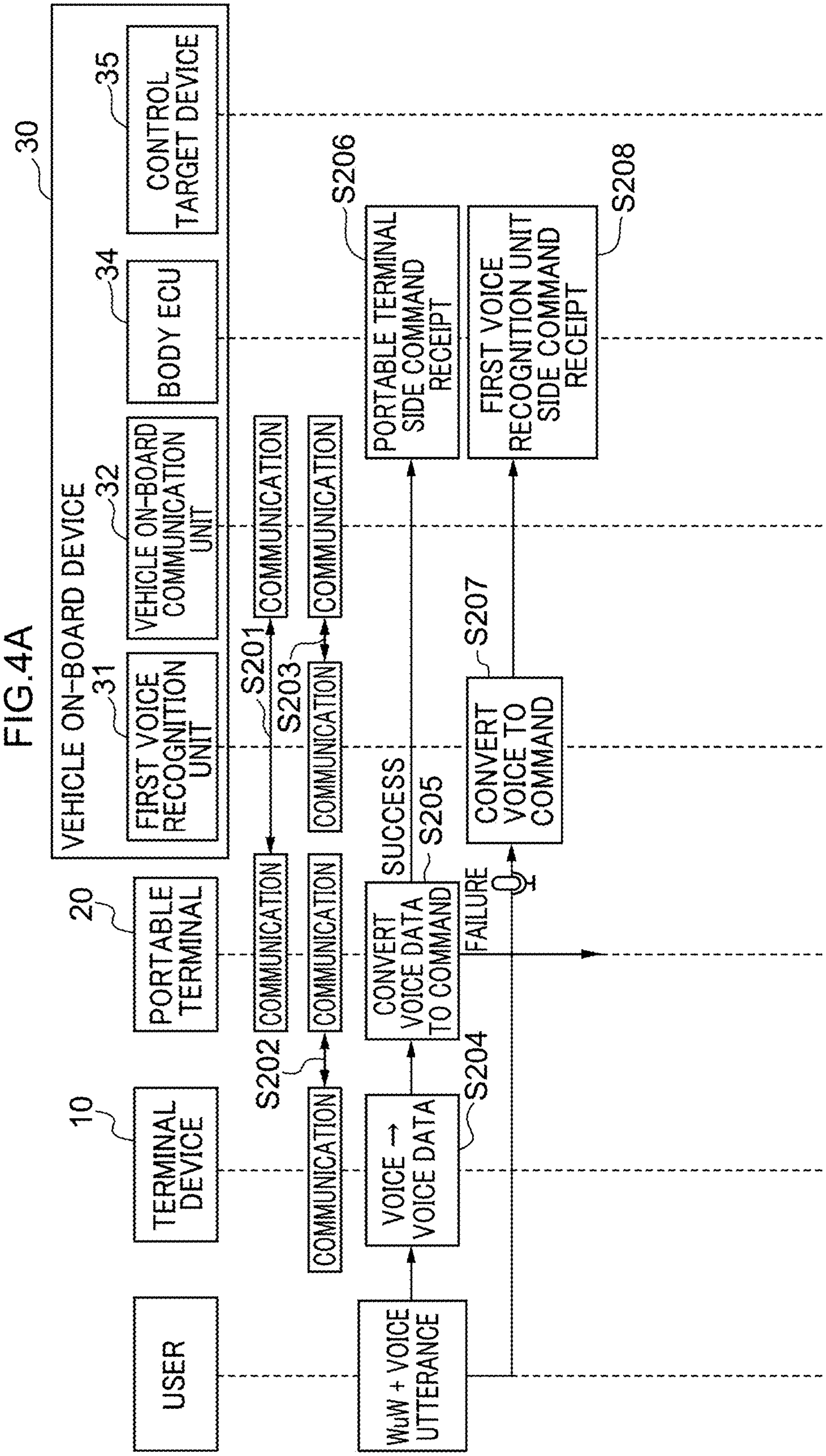
FIGS. 4A and 4B are sequence diagrams showing processing according to a second embodiment of the present disclosure.
Figure 4B:
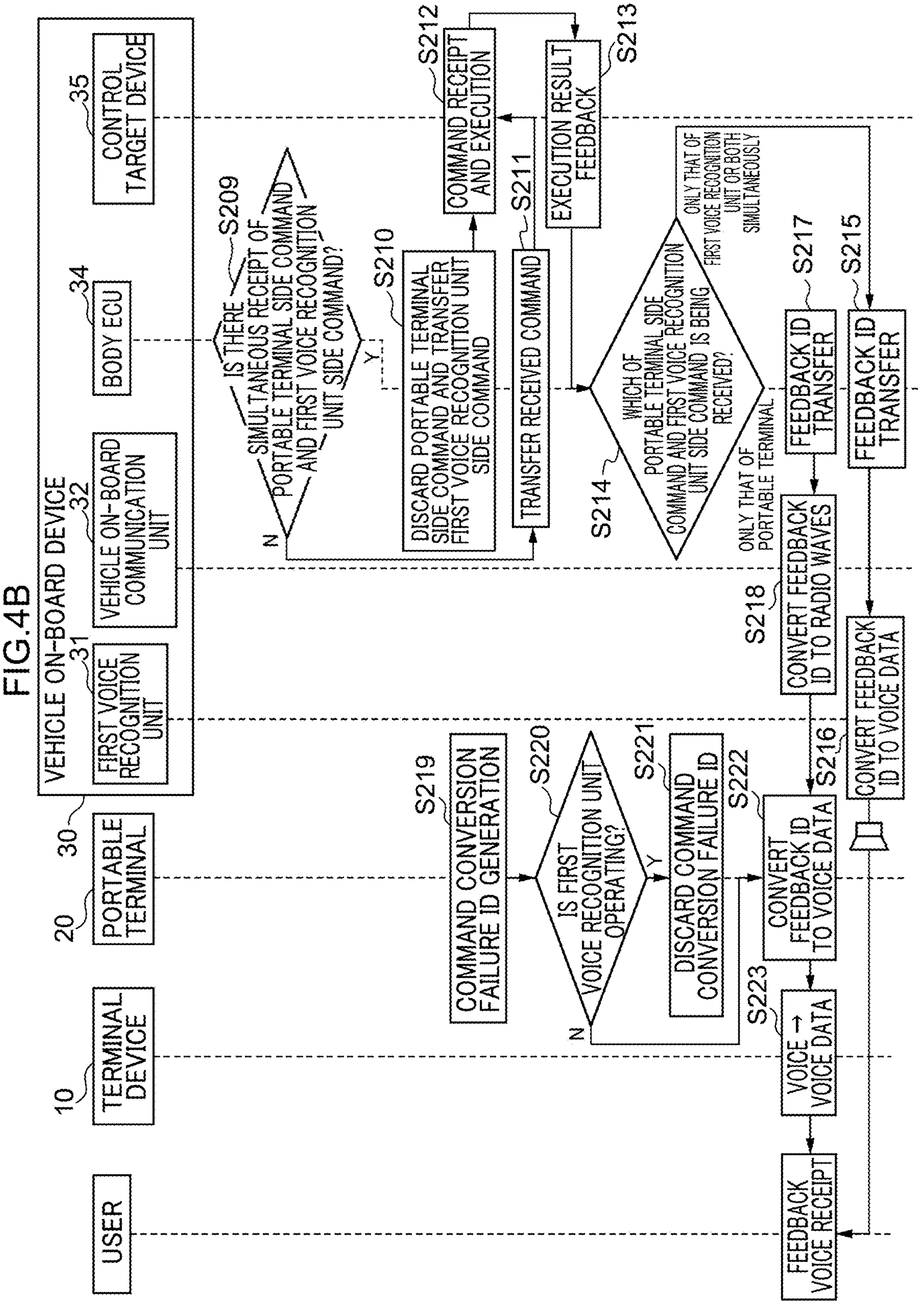

FIGS. 4A and 4B are sequence diagrams explaining processing carried out by the terminal device 10, the portable terminal 20, and the vehicle on-board device 30. The content of the processing will be explained with reference to FIG. 4A AND 4B. The present processing is started, for example, when the portable terminal 20 has arrived within the predetermined range 500 in which wireless communication with the vehicle on-board device 30 is possible.

At step S201, wireless communication is carried out between the portable communication unit 26 of the portable terminal 20 and the vehicle on-board communication unit 32 of the vehicle on-board device 30, and communication is established.

At step S202, wireless communication is carried out between the terminal communication unit 14 of the terminal device 10 and the portable communication unit 26 of the portable terminal 20, and communication is established. Further, at step S203, communication is carried out between the first voice recognition unit 31 of the vehicle on-board device 30 and the vehicle on-board communication unit 32, and communication is established.

Then, when the user utters the wake-up word and the voice command for controlling the vehicle, at step S204, the sound pick-up unit 13 of the terminal device 10 transmits the data of the picked-up voice to the second voice recognition unit 22 of the portable terminal 20.

At step S205, the first voice recognition unit 31 of the vehicle on-board device 30 recognizes the picked-up voice and performs conversion to a command. If the conversion of the command is successful, the command is transmitted to the body ECU 34.

At step S206, the body ECU 34 receives the command from the portable terminal 20.

Further, in parallel with aforementioned step S205, at step S207, the microphone of the vehicle on-board device 30 picks up the voice, and the first voice recognition unit 31 recognizes the picked-up voice, performs conversion to a command, and transmits the command to the body ECU 34.

At step S208, the body ECU 34 receives the command from the first voice recognition unit 31.

At step S209, it is determined whether or not the body ECU 34 has simultaneously received the command from the portable terminal 20 and the command from the first voice recognition unit 31. In a case in which the command from the portable terminal 20 and the command from the first voice recognition unit 31 have been simultaneously received, at step S210, the body ECU 34 discards the command from the portable terminal 20 and transfers the command from the first voice recognition unit 31 to the control target device 35.

On the other hand, in a case in which only one of the command from the portable terminal 20 or the command from the first voice recognition unit 31 has been received, at step S211, the body ECU 34 transfers the received command to the control target device 35.

At step S212, the control target device 35 receives the command from the body ECU 34 and executes the control according to the command.

At step S213, the control target device 35 provides feedback of the execution result of aforementioned step S212 to the body ECU 34.

At step S214, the body ECU 34 determines whether a command is being received from either of the portable terminal 20 and the first voice recognition unit 31. In a case in which the command is being received from only the first voice recognition unit 31, or the commands are being simultaneously received from the portable terminal 20 and the first voice recognition unit 31, at step S215, the body ECU 34 transfers the feedback ID indicating the feedback of aforementioned step S213 to the first voice recognition unit 31.

At step S216, the first voice recognition unit 31 performs conversion to voice data corresponding to the feedback ID, and outputs a voice corresponding to the voice data by using a speaker of the vehicle on-board device 30. Then, the user receives the voice providing feedback of the execution result of aforementioned step S212.

Further, in a case in which the command is being received from only the portable terminal 20, at step S217, the body ECU 34 transfers the feedback ID indicating the feedback of aforementioned step S213 to the vehicle on-board communication unit 32.

At step S218, the vehicle on-board communication unit 32 converts the feedback ID transferred from the body ECU 34 into radio waves to transmit it to the portable terminal 20 by wireless communication.

Further, in a case in which the conversion of the command has failed at aforementioned step S205, at step S219, the portable terminal 20 generates a feedback ID indicating that the conversion of the command has failed.

At step S220, the portable terminal 20 determines whether or not the first voice recognition unit 31 is operating. For example, in a case in which the communication at aforementioned step S203 is established, it is determined that the first voice recognition unit 31 is operating, and at step S221, the portable terminal 20 discards the feedback ID generated at aforementioned step S219. On the other hand, in a case in which the communication at aforementioned step S203 is not established, it is determined that the first voice recognition unit 31 is not operating, and the process proceeds to step S222.

At step S222, the portable terminal 20 performs conversion to voice data corresponding to the feedback ID and transmits the voice data to the terminal device 10.

At step S223, the terminal device 10 outputs a voice corresponding to the voice data by the sound emitting unit 11. Then, the user receives the voice providing feedback of the execution result of aforementioned step S212 or the voice providing feedback that the conversion of the command has failed.

Overview of Second Embodiment

In the vehicle control system of the present embodiment, the control of the vehicle according to the voice recognized by the first voice recognition unit 31 of the vehicle on-board device 30 is executed preferentially over the control of the vehicle specified by the specification unit 23 of the portable terminal 20. As a result, even in a case in which both the control of the vehicle specified by the portable terminal 20 and the control of the vehicle according to the voice recognized by the vehicle on-board device 30 exist, the control of the vehicle can be appropriately executed.

In the present embodiment, the voice recognition of the portable terminal 20 and the voice recognition of the first voice recognition unit 31 of the vehicle on-board device 30 are operated in parallel, and execution of the control of the vehicle according to the voice recognized at the first voice recognition unit 31 of the vehicle on-board device 30 is given priority. As a result, voice recognition is carried out at both the portable terminal 20 and the vehicle on-board device 30, and it is possible to suppress occurrence of inconvenience for the user.

Further, by carrying out the feedback corresponding to the voice command in consideration of an execution state of the control of the vehicle according to the voice recognized at the first voice recognition unit 31 of the vehicle on-board device 30, it is possible to make it appear that the control of the vehicle has been correctly executed.

Further, in the case of a voice command that is not prepared at the portable terminal 20 side, if the first voice recognition unit 31 of the vehicle on-board device 30 is operating, feedback corresponding to the voice recognized at the portable terminal 20 ("~ cannot be operated") can be stopped. For example, a case may be presumed in which voice commands prepared at the vehicle on-board device 30 side are related to operation of a navigation system, operation of a power window, and operation of a sliding roof, and voice commands prepared at the portable terminal 20 side are related to operation of the power window, operation of the sliding roof, operation of a door lock, operation of a power back door, and operation of a power sliding door. In this case, even if the voice command is related to operation of the navigation system, which is not prepared at the portable terminal 20 side, if the first voice recognition unit 31 of the vehicle on-board device 30 is operating, feedback corresponding to the voice recognized at the portable terminal 20 ("cannot be operated") can be stopped.

Third Embodiment

In the second embodiment, the control of the vehicle specified at the vehicle on-board device 30 is preferentially executed. On the other hand, a third embodiment is different from the second embodiment in that, in a case in which it has been determined that a person is not aboard the vehicle, the control of the vehicle specified at the portable terminal 20 is preferentially executed. Differences from the second embodiment will be explained below. It should be noted that identical reference numerals are given to identical configurations, and that explanation thereof is omitted.

(Configuration)

The vehicle on-board control unit 33 of the vehicle on-board device 30 determines whether or not a person is aboard the vehicle, and, in a case in which it has been determined that a person is not aboard the vehicle, the vehicle on-board control unit 33 preferentially executes the control of the vehicle specified by the specification unit 23 of the portable terminal 20 over the control of the vehicle according to the voice recognized by the first voice recognition unit 31.

Specifically, the vehicle on-board control unit 33 uses the vehicle on-board sensor 36 to carry out position determination for a person and determine whether the person is inside a vehicle cabin or outside the vehicle cabin. For example, as the vehicle on-board sensor 36, an occupant monitor, a seating sensor, a seatbelt buckle, or an intruder sensor is used to determine whether a person is inside the vehicle cabin or is outside the vehicle cabin.

Alternatively, a door sensor and a seating sensor are used to determine whether a person is inside the vehicle cabin or is outside the vehicle cabin. For example, in a case in which it has been detected by the door sensor that a door has changed from an open state to a closed state and it has been detected by the seating sensor that a person is not seated, it is determined that the person is outside the vehicle cabin. Further, in a case in which it has been detected by the door sensor that the door is in an open state and it has been detected by the seating sensor that a person is not seated, it is determined that the person is outside the vehicle cabin. Furthermore, in a case in which it has been detected by the door sensor that the door is in a closed state, it has been detected by the seating sensor that a person is seated, and an ignition switch is on, it is determined that the person is inside the vehicle cabin.

Alternatively, whether a vehicle power source is on or off and whether or not the vehicle is stopped are used to determine whether a person is inside the vehicle cabin or outside the vehicle cabin. For example, in a case in which the vehicle power source is on and a shift lever is in a parking range, it is determined that there is a possibility that a person may be outside the vehicle cabin. Further, in a case in which the vehicle power source is on and the shift lever is outside of the parking range, it is determined that a person is inside the vehicle cabin.

In a case in which the vehicle on-board control unit 33 has simultaneously received the command for the control of the vehicle according to the voice recognized by the first voice recognition unit 31 and the command for the control of the vehicle specified by the specification unit 23 of the portable terminal 20, if it is determined that a person is inside the vehicle cabin, the vehicle on-board control unit 33 discards the command for the control of the vehicle specified by the specification unit 23 of the portable terminal 20 and executes the command for the control of the vehicle according to the voice recognized by the first voice recognition unit 31. On the other hand, in a case in which the vehicle on-board control unit 33 has simultaneously received the command for the control of the vehicle according to the voice recognized by the first voice recognition unit 31 and the command for the control of the vehicle specified by the specification unit 23 of the portable terminal 20, if it is determined that a person is outside the vehicle cabin, the vehicle on-board control unit 33 discards the command for the control of the vehicle according to the voice recognized by the first voice recognition unit 31 and executes the command for the control of the vehicle specified by the specification unit 23 of the portable terminal 20.

Alternatively, in a case in which it has been determined that a person is inside the vehicle cabin, the vehicle on-board control unit 33 stops the second voice recognition unit 22 of the portable terminal 20.

(Processing)

Figure 5A:
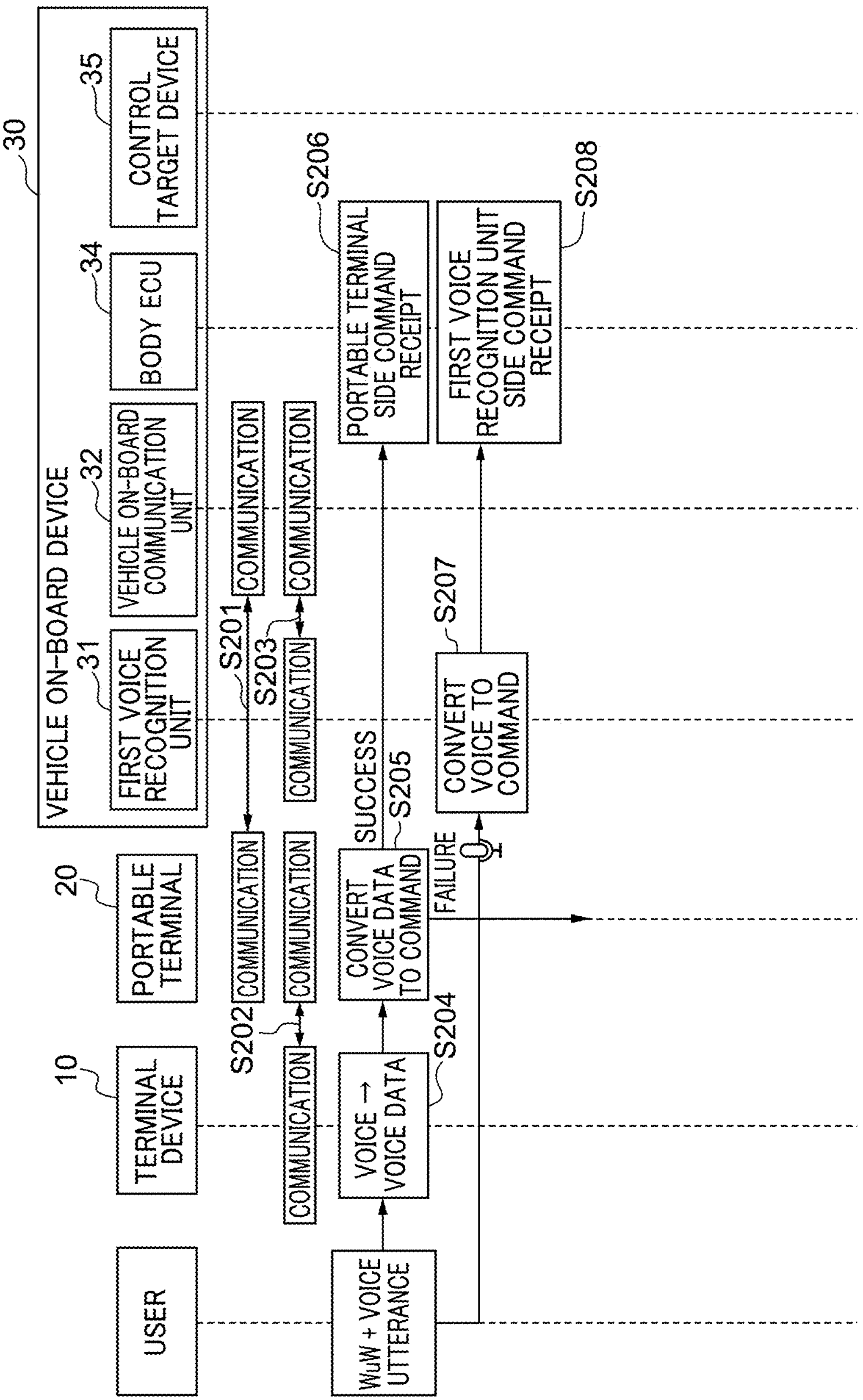
FIGS. 5A and 5B are sequence diagrams showing processing according to a third embodiment of the present disclosure.
Figure 5B:
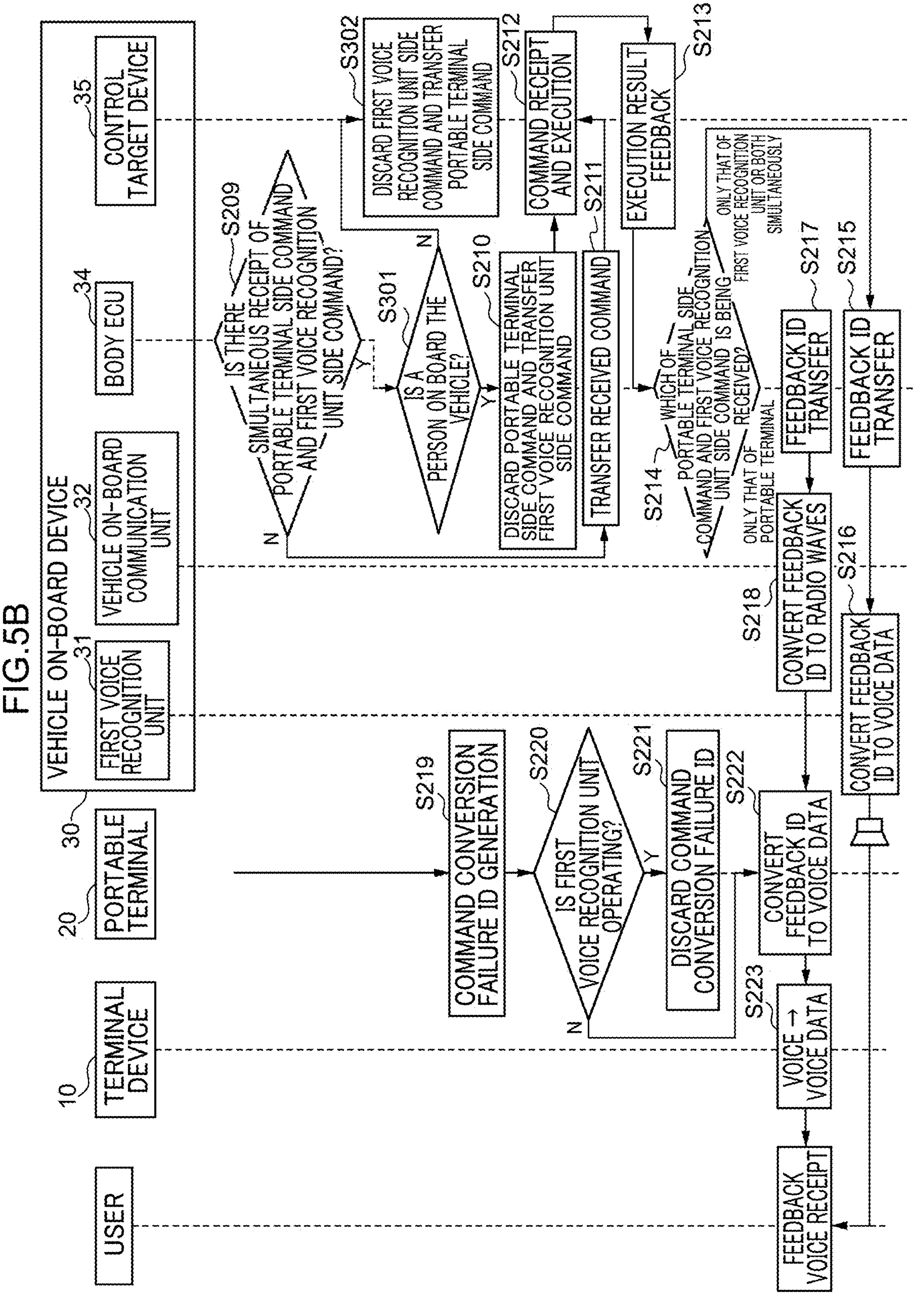

FIGS. 5A and 5B are sequence diagrams explaining processing carried out by the terminal device 10, the portable terminal 20, and the vehicle on-board device 30. The content of the processing will be explained with reference to FIGS. 5A and 5B. The present processing is started, for example, when the portable terminal 20 has arrived within the predetermined range 500 in which wireless communication with the vehicle on-board device 30 is possible. It should be noted that identical reference numerals are given to processing that is the same as in aforementioned FIGS. 4A and 4B, and that explanation thereof is omitted.

First, the same processing as in steps S201 to S209 of aforementioned FIGS. 4A and 4B is carried out.

Then, at step S301, the body ECU 34 uses the vehicle on-board sensor 36 to determine whether or not a person is aboard the vehicle. In a case in which it has been determined that a person is aboard the vehicle, at step S210, the body ECU 34 discards the command from the portable terminal 20 and transfers the command from the first voice recognition unit 31 to the control target device 35.

On the other hand, in a case in which it has been determined that a person is not aboard the vehicle, at step S302, the body ECU 34 discards the command from the first voice recognition unit 31 and transfers the command from the portable terminal 20 to the control target device 35.

Then, the same processing as in steps S211 to S223 of aforementioned FIGS. 4A and 4B is carried out.

Overview of Third Embodiment

According to the vehicle control system of the present embodiment, even in a case in which both the control of the vehicle specified by the portable terminal 20 and the control of the vehicle according to the voice recognized by the vehicle on-board device 30 exist, the control of the vehicle can be appropriately executed. In particular, in a case in which it has been determined from the vehicle on-board sensor 36 that a person is not aboard the vehicle even though the power source of the vehicle is on, the control of the vehicle specified by the portable terminal 20 can be preferentially executed.

Fourth Embodiment

In the third embodiment, the vehicle on-board sensor 36 is used to determine whether or not a person is aboard the vehicle. On the other hand, a fourth embodiment is different from the third embodiment in that it is determined whether or not a person is aboard the vehicle by using information obtained at the terminal device 10. Differences from the third embodiment will be explained below. It should be noted that identical reference numerals are given to identical configurations, and that explanation thereof is omitted.

(Configuration)

The sound pick-up unit 13 of the terminal device 10 transmits picked-up data to the vehicle on-board device 30 via the portable terminal 20. The vehicle on-board control unit 33 of the vehicle on-board device 30 determines whether or not a person is aboard the vehicle based on the data that has been picked up at the sound pick-up unit 13 of the terminal device 10, and, in a case in which it has been determined that a person is not aboard the vehicle, the vehicle on-board control unit 33 preferentially executes the control of the vehicle specified by the specification unit 23 of the portable terminal 20 over the control of the vehicle according to the voice recognized by the first voice recognition unit 31.

Specifically, the vehicle on-board control unit 33 carries our position determination for a person from the picked-up data, and determines whether the person is inside the vehicle cabin or outside the vehicle cabin. For example, if a sound when the door is changed to the closed state, wind pressure when the door is changed to the closed state, or pressure fluctuation when the door is changed to the closed state is detected from the picked-up data, it is determined that the person is inside the vehicle cabin. Further, if music when the navigation system is activated or an ETC activation sound is detected from the picked-up data as a sound that is characteristic at the time of vehicle boarding, it is determined that the person is inside the vehicle cabin. Furthermore, if negative pressure when the door is changed to the open state is detected from the picked-up data, it is determined that the person is outside the vehicle cabin.

It should be noted that, in a case in which the terminal device 10 is provided with a sensor (for example, an acceleration sensor) for detecting motion, the terminal device 10 transmits the data of the sensor to the vehicle on-board device 30 via the portable terminal 20. The vehicle on-board control unit 33 of the vehicle on-board device 30 may be configured so as to determine that a person is aboard the vehicle in a case in which motion at the time of sitting has been detected based on the data of the sensor that has been received from the terminal device 10, and so as to determine that a person is not aboard the vehicle in a case in which motion at the time of leaving a seat has been detected based on the data of the sensor that has been received from the terminal device 10. For example, in a case in which vertical movement corresponding to walking, steep downward movement, rotational movement, and steady movement have been detected in order based on the data of the sensor that has been received from the terminal device 10, it is determined that the person is inside the vehicle cabin. Further, in a case in which steady movement, steep upward movement, and vertical movement corresponding to walking have been detected in order based on the data of the sensor that has been received from the terminal device 10, it is determined that the person is outside the vehicle cabin.

It should be noted that, since other configuration and processing of the vehicle control system of the fourth embodiment are the same as those of the third embodiment, explanation thereof is omitted.

Overview of Fourth Embodiment

According to the vehicle control system of the present embodiment, even in a case in which both the control of the vehicle specified by the portable terminal 20 and the control of the vehicle according to the voice recognized by the vehicle on-board device 30 exist, the control of the vehicle can be appropriately executed. In particular, in a case in which it has been determined from information obtained at the terminal device 10 that a person is not aboard the vehicle even though the power source of the vehicle is on, the control of the vehicle specified by the portable terminal 20 can be preferentially executed.

Fifth Embodiment

In the third and fourth embodiments, in a case in which it has been determined that a person is not aboard the vehicle, the control of the vehicle specified by the specification unit 23 of the portable terminal 20 is preferentially executed. On the other hand, a fifth embodiment differs from the third and fourth embodiments in that, in a case in which the voice recognized at the portable terminal 20 includes a specific character string, the control of the vehicle specified by the specification unit 23 of the portable terminal 20 is preferentially executed. Differences from the third embodiment will be explained below. It should be noted that identical reference numerals are given to identical configurations, and that explanation thereof is omitted.

(Configuration)

The vehicle on-board control unit 33 of the vehicle on-board device 30 determines whether or not the voice recognized at the portable terminal 20 includes a specific character string, and, in a case in which it has been determined that the specific character string is included, the vehicle on-board control unit 33 preferentially executes the control of the vehicle specified by the specification unit 23 of the portable terminal 20 over the control of the vehicle according to the voice recognized by the first voice recognition unit 31.

Specifically, in a case in which a specific character string (for example, "OK AAA"), which is a wake-up word, is included in the voice recognized at the portable terminal 20 when the ignition switch is off, the vehicle on-board control unit 33 of the vehicle on-board device 30 activates the control of the vehicle in accordance with the voice and emits voice feedback for confirmation via the portable terminal 20 and the terminal device 10.

Further, in a case in which a specific character string (for example, "Outside AAA"), which is a wake-up word, is included in the voice recognized at the portable terminal 20 when the ignition switch is on, the vehicle on-board control unit 33 of the vehicle on-board device 30 activates the control of the vehicle in accordance with the voice and emits voice feedback for confirmation via the portable terminal 20 and the terminal device 10.

Further, in a case in which a specific character string (for example, "Open the back door"), which is a voice command, is included in the voice recognized at the portable terminal 20 when the ignition switch is off, the vehicle on-board control unit 33 of the vehicle on-board device 30 performs conversion to a command for opening the back door and transmits the command to the body ECU 34 to be executed.

At this time, in a case in which the vehicle on-board control unit 33 is simultaneously receiving a command for the control of the vehicle according to the voice recognized by the first voice recognition unit 31 and a command for the control of the vehicle specified by the specification unit 23 of the portable terminal 20, the vehicle on-board control unit 33 discards the command for the control of the vehicle according to the voice recognized by the first voice recognition unit 31.

Further, in a case in which a specific character string (for example, "Open the back door from the outside"), which is a voice command, is included in the voice recognized at the portable terminal 20, the vehicle on-board control unit 33 of the vehicle on-board device 30 performs conversion to a command for opening the back door and transmits the command to the body ECU 34 to be executed.

At this time, in a case in which the vehicle on-board control unit 33 is simultaneously receiving a command for the control of the vehicle according to the voice recognized by the first voice recognition unit 31 and a command for the control of the vehicle specified by the specification unit 23 of the portable terminal 20, the vehicle on-board control unit 33 discards the command for the control of the vehicle according to the voice recognized by the first voice recognition unit 31.

(Processing)

Figure 6:
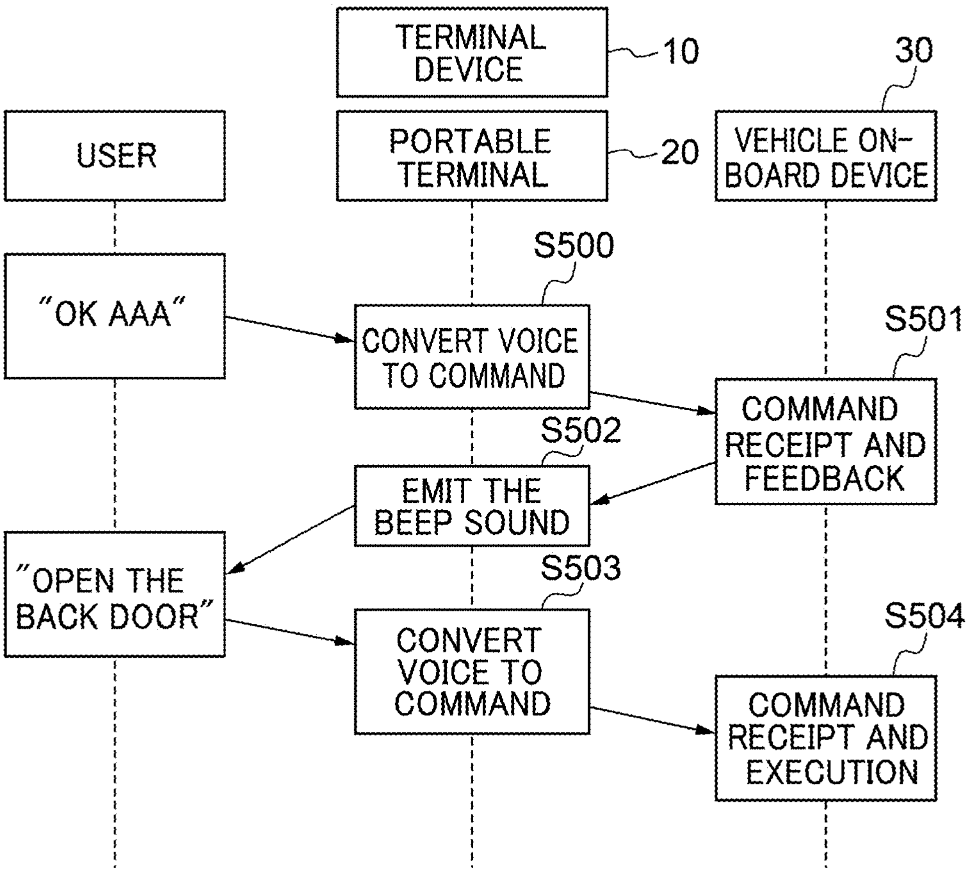
FIG. 6 is a sequence diagram showing an example of processing according to a fifth embodiment of the present disclosure.

FIG. 6 is a sequence diagram explaining an example of processing carried out by the terminal device 10, the portable terminal 20, and the vehicle on-board device 30. The content of the processing will be explained with reference to FIG. 6. The present processing is started, for example, when the portable terminal 20 has arrived within the predetermined range 500 in which wireless communication with the vehicle on-board device 30 is possible. Further, a case in which the ignition switch is off will be explained.

First, the same processing as in steps S201 to S203 of aforementioned FIGS. 4A and 4B is executed.

Then, when the user utters the wake-up word "OK AAA", at step S500, the sound pick-up unit 13 of the terminal device 10 transmits data of the voice that has been picked up to the second voice recognition unit 22 of the portable terminal 20, the second voice recognition unit 22 of the portable terminal 20 recognizes the picked-up voice, and the specification unit 23 performs conversion to a command and transmits the command to the body ECU 34.

At step S501, the body ECU 34 receives the command from the portable terminal 20. The body ECU 34 transmits a feedback ID indicating that activation has been carried out to the portable terminal 20.

At step S502, the portable terminal 20 performs conversion to voice data corresponding to the feedback ID and transmits the voice data to the terminal device 10. The terminal device 10 outputs a voice "Beep" corresponding to the voice data by the sound emitting unit 11.

Next, when the user utters the voice command "Open the back door", at step S503, the sound pick-up unit 13 of the terminal device 10 transmits data of the voice that has been picked up to the second voice recognition unit 22 of the portable terminal 20, the second voice recognition unit 22 of the portable terminal 20 recognizes the picked-up voice, and the specification unit 23 performs conversion to a command and transmits the command to the body ECU 34.

At step S504, the body ECU 34 receives the command from the portable terminal 20 and transfers the received command to the control target device 35. The control target device 35 receives the command from the body ECU 34 and executes the control according to the command.

In the processing of aforementioned FIG. 6, in a case in which the ignition switch is on, even if the voice command "Open the back door" is uttered, the body ECU 34 determines that the command that has been received from the portable terminal 20 is a command that is not acted upon in a case in which the ignition switch is on, and transmits a feedback ID indicating that the voice command is not supported to the portable terminal 20. The portable terminal 20 performs conversion to voice data corresponding to the feedback ID and transmits the voice data to the terminal device 10. The terminal device 10 outputs a voice (for example, "Not supported") corresponding to the voice data by the sound emitting unit 11.

Figure 7:
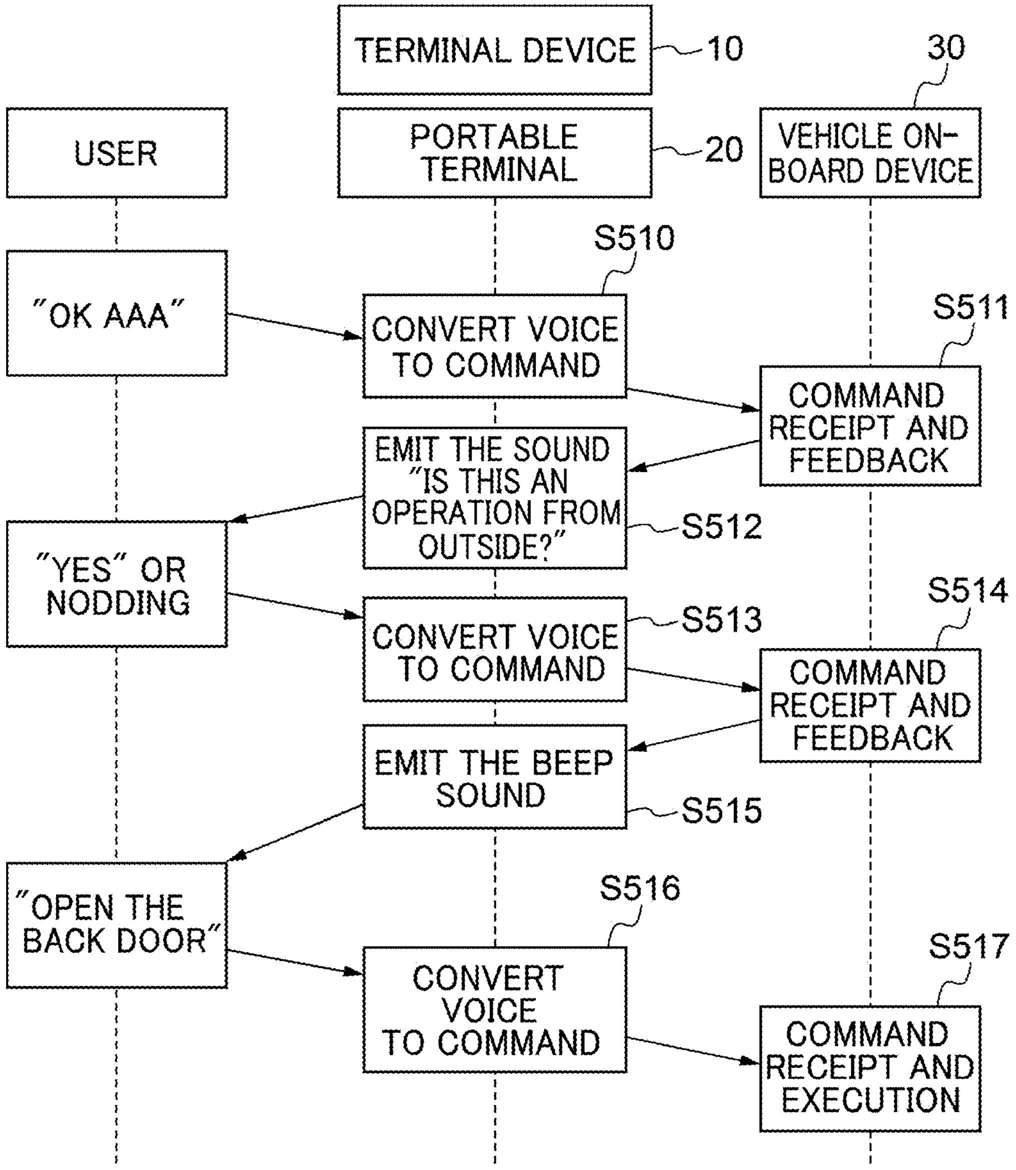
FIG. 7 is a sequence diagram showing another example of processing according to the fifth embodiment of the present disclosure.

FIG. 7 is a sequence diagram explaining another example of processing carried out by the terminal device 10, the portable terminal 20, and the vehicle on-board device 30. The content of the processing will be explained with reference to FIG. 7. The present processing is started, for example, when the portable terminal 20 has arrived within the predetermined range 500 in which wireless communication with the vehicle on-board device 30 is possible. Further, a case in which the ignition switch is on and the user holding the terminal device 10 and the portable terminal 20 is outside the vehicle cabin will be explained. Further, it is assumed that the terminal device 10 is provided with a sensor (for example, an acceleration sensor) for detecting motion.

First, the same processing as in steps S201 to S203 of aforementioned FIGS. 4A and 4B is executed.

Then, when the user utters the wake-up word "OK AAA", at step S510, the sound pick-up unit 13 of the terminal device 10 transmits data of the voice that has been picked up to the second voice recognition unit 22 of the portable terminal 20, the second voice recognition unit 22 of the portable terminal 20 recognizes the picked-up voice, and the specification unit 23 performs conversion to a command and transmits the command to the body ECU 34.

At step S511, the body ECU 34 receives the command from the portable terminal 20. The body ECU 34 transmits a feedback ID indicating that an operation from outside the vehicle cabin is confirmed to the portable terminal 20.

At step S512, the portable terminal 20 performs conversion to voice data corresponding to the feedback ID and transmits the voice data to the terminal device 10. The terminal device 10 outputs the voice "Is this an operation from outside?" corresponding to the voice data by the sound emitting unit 11.

Next, when the user utters the response "Yes" or makes a nodding movement, at step S513, the sound pick-up unit 13 of the terminal device 10 transmits data of the voice that has been picked up to the second voice recognition unit 22 of the portable terminal 20, the second voice recognition unit 22 of the portable terminal 20 recognizes the picked-up voice, and the specification unit 23 performs conversion to a command and transmits the command to the body ECU 34.

Alternatively, the sensor of the terminal device 10 transmits data of the sensor to the portable terminal 20, the specification unit 23 determines whether or not there was a nodding movement, and, in a case in which it has been determined that there was a nodding movement, the specification unit 23 performs conversion to a command and transmits the command to the body ECU 34.

At step S514, the body ECU 34 receives the command from the portable terminal 20 and transmits a feedback ID indicating that activation has been carried out to the portable terminal 20.

At step S515, the portable terminal 20 performs conversion to voice data corresponding to the feedback ID and transmits the voice data to the terminal device 10. The terminal device 10 outputs the voice "Beep" corresponding to the voice data by the sound emitting unit 11.

Next, when the user utters the voice command "Open the back door", at step S516, the sound pick-up unit 13 of the terminal device 10 transmits data of the voice that has been picked up to the second voice recognition unit 22 of the portable terminal 20, the second voice recognition unit 22 of the portable terminal 20 recognizes the picked-up voice, and the specification unit 23 performs conversion to a command and transmits the command to the body ECU 34.

At step S517, the body ECU 34 receives the command from the portable terminal 20 and transfers the received command to the control target device 35. The control target device 35 receives the command from the body ECU 34 and executes the control according to the command.

Overview of Fifth Embodiment

According to the vehicle control system of the present embodiment, in a case in which a specific character string is included in the voice recognized by the portable terminal 20, the vehicle on-board control unit 33 of the vehicle on-board device 30 preferentially executes the control of the vehicle specified by the specification unit 23 of the portable terminal 20 over the control of the vehicle according to the voice recognized by the first voice recognition unit 31 of the vehicle on-board device 30. As a result, even in a case in which both the control of the vehicle specified by the portable terminal 20 and the control of the vehicle according to the voice recognized by the vehicle on-board device 30 exist, the control of the vehicle can be appropriately executed.

In particular, even if the ignition switch is on, in a case in which a specific character string is included in the voice recognized by the portable terminal 20, the control of the vehicle specified by the specification unit 23 of the portable terminal 20 can be preferentially executed.

Further, a wake-up word and a voice command that prioritize execution according to the voice recognized at the portable terminal 20 side can be prepared for a case in which the ignition switch is on, and it is possible to distinguish from a case in which the ignition switch is off.

[Notes]

It should be noted that the processing that the CPUs read software (programs) to execute in the embodiments described above may be executed by various types of processors other than a CPU. Examples of such processors include a Programmable Logic Device (PLD) in which circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). Further, each processing may be executed by one of these various types of processors, or may be executed by a combination of two or more of the same type or different types of processors (for example, plural FPGAs, a combination of a CPU and an FPGA, or the like). Furthermore, a hardware structure of these various types of processors is, more specifically, an electric circuit in which circuit elements, such as semiconductor elements or the like, are combined.

Further, in the embodiments described above, aspects have been described in which each of the programs is stored (installed) in advance on a non-transitory computer-readable recording medium. For example, in the ECU, a program is stored in a ROM in advance. However, the present invention is not limited to this, and the respective programs may be stored in a storage such as a Hard Disk Drive (HDD), an SSD, or the like. Further, the respective programs may be provided in a format that is recorded on a non-transitory recording medium such as a Compact Disc Read Only Memory (CD-ROM), a Digital Versatile Disc Read Only Memory (DVD-ROM), a Universal Serial Bus (USB) memory, or the like. Furthermore, the respective programs may be provided in a format that is downloaded from an external device via a network.

The processing flows described in the above embodiments are merely examples thereof, and unnecessary steps may be omitted, new steps may be added, and the processing sequence may be changed, within a range that does not depart from the gist thereof.

What is claimed is:

1. A vehicle control system, comprising:
- a portable terminal; and
- a vehicle on-board device that carries out wireless communication with the portable terminal, wherein:
- the vehicle on-board device comprises circuitry configured to function as:
  - a first biometric information recognition unit configured to recognize biometric information, and
  - a first control unit configured to execute control of a vehicle in accordance with the biometric information recognized at the first biometric information recognition unit, and the portable terminal comprises circuitry configured to function as a second biometric information recognition unit configured to recognize biometric information, a specification unit configured to specify control of the vehicle in accordance with the biometric information recognized at the second biometric information recognition unit, an instruction unit configured to instruct the first control unit to execute the specified control of the vehicle, and a second control unit configured to effect control so as to perform notification, by the portable terminal, indicating that the control of the vehicle cannot be specified by the specification unit, in a case in which the control of the vehicle in accordance with the biometric information recognized at the second biometric information recognition unit cannot be specified at the specification unit after the biometric information is recognized at the second biometric information recognition unit and recognition of the biometric information by the first biometric information recognition unit is not operating, and effect control so as not to perform notification, by the portable terminal, indicating that the control of the vehicle cannot be specified by the specification unit, in a case in which the control of the vehicle in accordance with the biometric information recognized at the second biometric information recognition unit cannot be specified at the specification unit and recognition of the biometric information by the first biometric information recognition unit is operating.

2. The vehicle control system according to claim 1, wherein the first control unit preferentially executes the control of the vehicle according to the biometric information recognized by the first biometric information recognition unit over the control of the vehicle specified by the specification unit of the portable terminal.

3. The vehicle control system according to claim 1, wherein the first control unit determines whether or not a person is aboard the vehicle based on information acquired at the vehicle on-board device and, in a case in which it has been determined that a person is not aboard the vehicle, preferentially executes the control of the vehicle specified by the specification unit of the portable terminal over the control of the vehicle according to the biometric information recognized by the first biometric information recognition unit.

4. The vehicle control system according to claim 1, wherein, in a case in which it has been determined that a person is not aboard the vehicle based on information acquired at the portable terminal, the first control unit preferentially executes the control of the vehicle specified by the specification unit of the portable terminal over the control of the vehicle according to the biometric information recognized by the first biometric information recognition unit.

5. The vehicle control system according to claim 1, wherein, in a case in which a specific character string is included in the biometric information recognized by the second biometric information recognition unit, the first control unit preferentially executes the control of the vehicle specified by the specification unit of the portable terminal over the control of the vehicle according to the biometric information recognized by the first biometric information recognition unit.

6. A portable terminal that carries out wireless communication with a vehicle on-board device that comprises a first biometric information recognition unit configured to recognize biometric information, and a first control unit configured to execute control of a vehicle in accordance with the biometric information recognized at the first biometric information recognition unit, the portable terminal comprising circuitry configured to function as:

a second biometric information recognition unit configured to recognize biometric information;

a specification unit configured to specify control of the vehicle in accordance with the biometric information recognized at the second biometric information recognition unit;

an instruction unit configured to instruct the first control unit to execute the specified control of the vehicle; and a second control unit configured to effect control so as to perform notification, by the portable terminal, indicating that the control of the vehicle cannot be specified by the specification unit in a case in which the control of the vehicle in accordance with the biometric information recognized at the second biometric information recognition unit cannot be specified at the specification unit after the biometric information is recognized at the second biometric information recognition unit and recognition of the biometric information by the first biometric information recognition unit is not operating, and effect control so as not to perform notification, by the portable terminal, indicating that the control of the vehicle cannot be specified by the specification unit, in a case in which the control of the vehicle in accordance with the biometric information recognized at the second biometric information recognition unit cannot be specified at the specification unit and recognition of the biometric information by the first biometric information recognition unit is operating.

7. The portable terminal according to claim 6, wherein the first control unit preferentially executes the control of the vehicle according to the biometric information recognized by the first biometric information recognition unit over the control of the vehicle specified by the specification unit of the portable terminal.

8. The portable terminal according to claim 6, wherein the first control unit determines whether or not a person is aboard the vehicle based on information acquired at the vehicle on-board device and, in a case in which it has been determined that a person is not aboard the vehicle, preferentially executes the control of the vehicle specified by the specification unit of the portable terminal over the control of the vehicle according to the biometric information recognized by the first biometric information recognition unit.

9. The portable terminal according to claim 6, wherein, in a case in which it has been determined that a person is not aboard the vehicle based on information acquired at the portable terminal, the first control unit preferentially executes the control of the vehicle specified by the specification unit of the portable terminal over the control of the vehicle according to the biometric information recognized by the first biometric information recognition unit.

10. The portable terminal according to claim 6, wherein, in a case in which a specific character string is included in the biometric information recognized by the second biometric information recognition unit, the first control unit preferentially executes the control of the vehicle specified by the specification unit of the portable terminal over the control of the vehicle according to the biometric information recognized by the first biometric information recognition unit.

* * * * *